United States Patent
Poppinga et al.

(10) Patent No.: US 7,547,037 B2
(45) Date of Patent: Jun. 16, 2009

(54) PULL CART

(75) Inventors: Lucas Poppinga, Groningen (NL);
Cornelis Albert Maijers, Groningen (NL)

(73) Assignee: Celter B.V. (NL)

( * ) Notice: Subject to any disclaimer, the term of this patent is extended or adjusted under 35 U.S.C. 154(b) by 0 days.

(21) Appl. No.: 11/575,167

(22) PCT Filed: Sep. 7, 2005

(86) PCT No.: PCT/NL2005/000645
§ 371 (c)(1),
(2), (4) Date: Dec. 18, 2007

(87) PCT Pub. No.: WO2006/031101
PCT Pub. Date: Mar. 23, 2006

(65) Prior Publication Data
US 2008/0217886 A1 Sep. 11, 2008

(51) Int. Cl.
*B62B 3/02* (2006.01)
(52) U.S. Cl. .................. 280/651; 280/639; 280/656
(58) Field of Classification Search .............. 280/639, 280/38, 39, 641, 42, 651, 656, 659
See application file for complete search history.

(56) References Cited

U.S. PATENT DOCUMENTS

| | | | | |
|---|---|---|---|---|
| 2,847,227 A * | 8/1958 | Lankford | ............... | 280/42 |
| 3,079,167 A * | 2/1963 | Russell | ............... | 280/641 |
| 4,664,397 A * | 5/1987 | Reinboth | ............... | 280/39 |
| 4,964,650 A * | 10/1990 | Dickinson | ............... | 280/641 |
| 5,785,334 A * | 7/1998 | Robinson | ............... | 280/204 |
| 5,915,723 A * | 6/1999 | Austin | ............... | 280/651 |
| 6,491,318 B1 * | 12/2002 | Galt et al. | ............... | 280/651 |
| 6,845,991 B1 * | 1/2005 | Ritucci et al. | ............... | 280/30 |
| 2003/0025301 A1 * | 2/2003 | Banuelos, III | ............... | 280/651 |

\* cited by examiner

*Primary Examiner*—Christopher P Ellis
*Assistant Examiner*—John D Walters
(74) *Attorney, Agent, or Firm*—DLA Piper LLP (US); R. Blake Johnston

(57) ABSTRACT

A pull cart comprising a frame (H, 12, 13, 14), a flexible carrier structure (20) connected to the frame, and a suspension (30, 31) connected to the frame. The frame comprises a first (11) and a second (12) substantially U-shaped frame part. The suspension comprises a first suspension part (30) connected to the first frame part and a second suspension part (31) connected to second frame part. The first frame part can hinge relative to at least the second frame part about an axis (3) extending substantially parallel to the bottom of its U-shape. In a folded-out operative condition, on the one side, the suspension is connected to the frame such that forces introduced through the first and second suspension parts force the first and second frame parts apart, and, on the other side, the flexible carrier structure connects the first and second U-shaped frame parts such that the first and second frame parts are prevented from pivoting beyond said folded-out position.

12 Claims, 4 Drawing Sheets

PULL CART

Figure 1:
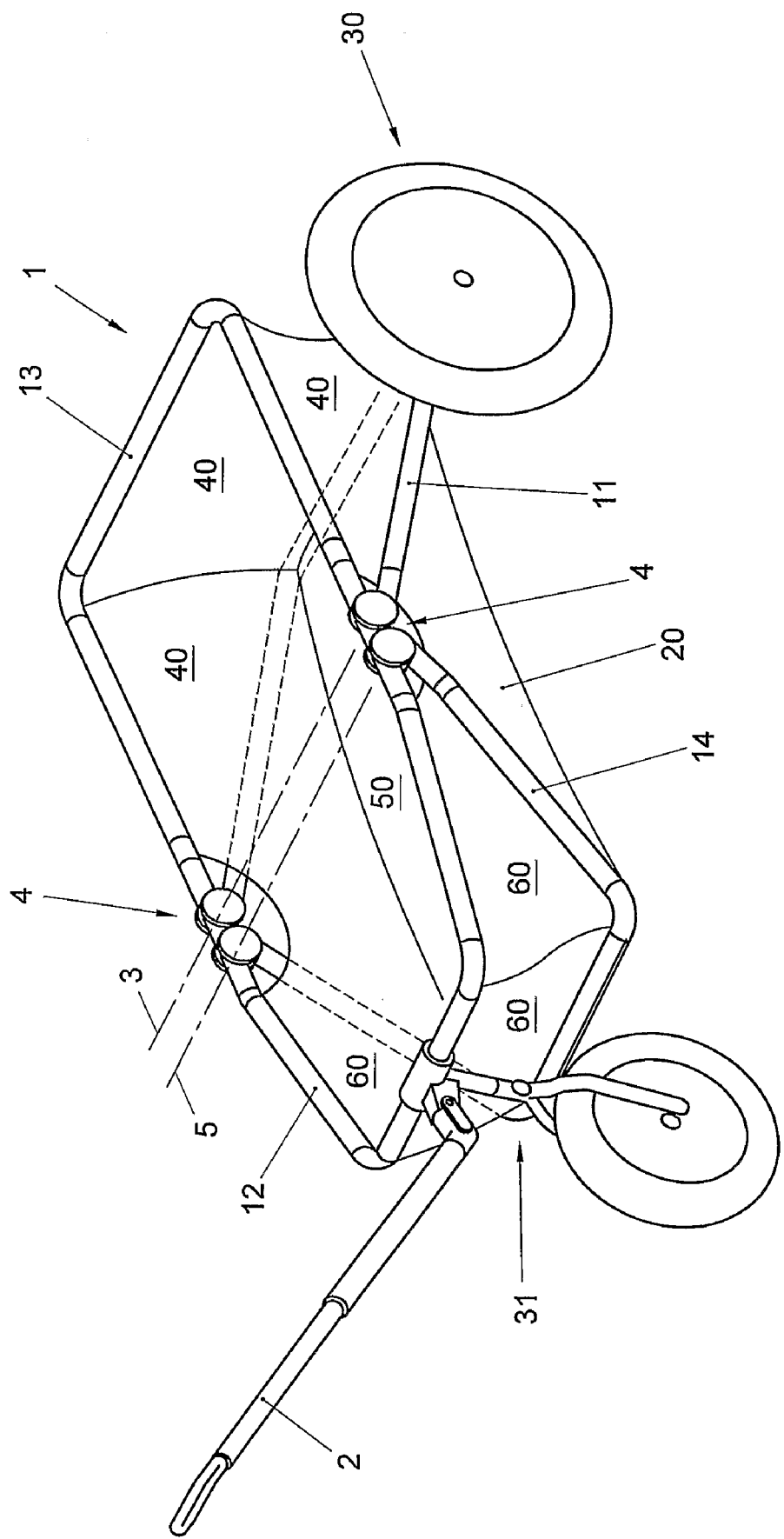

The invention relates to a pull cart.

An example of a known pull cart is the so-called rumbling cart. It is often used for recreational purposes in various surroundings such as woods or the beach, for, for instance, pulling children forward. A drawback of the rumbling cart is that it is heavy. Also, as a rule, the rumbling cart cannot be taken apart rapidly. Further, when in taken apart condition, the cart is still too large to be stored and transported in, for instance, the boot of a car. In view of the purposes of use of a pull cart, it is desirable to have a pull cart which is lightweight, can simply and rapidly be reduced and enlarged in size, has a compact shape in reduced condition and is suitable for durable use.

The object of the invention is to provide a folding pull cart which can be handled well and is durable.

To this end, the invention provides a pull cart comprising a frame, a carrier structure connected to the frame for carrying a load, a suspension connected to the frame and which supports the frame in operative condition, wherein:

- the frame comprises a first substantially U-shaped frame part and a second substantially U-shaped frame part;
- the suspension comprises a first suspension part connected to the first frame part and a second suspension part connected to the second frame part;
- the first frame part can hinge relative to at least the second frame part, about an axis extending substantially parallel to the bottom of its U-shape, between a collapsed position and a folded-out position, while the distance between the bottom of the U-shape of the first frame part and the bottom of the U-shape of the second frame part is smaller in the collapsed position than in the folded-out position; and
- in the folded-out position, with the pull cart in operative condition, on the one side, the suspension is connected to the frame such that forces introduced through the first and second suspension part force the first and second frame parts apart, and, on the other side, the flexible carrier structure connects the first and second U-shaped frame parts at least at a distance from the axis such that the first and second frame parts are prevented from pivoting apart beyond the folded-out position.

Due to the above-mentioned connections between the suspension and the frame and between the flexible carrier structure and the frame, in the folded-out position when the pull cart is in an operative condition, tensile forces in the flexible carrier structure contribute to the strength of the pull cart. These tensile forces can further be uniformly distributed over the circumference of the flexible carrier structure. Thus, with the strength of the pull cart remaining the same, the pull cart can be made of lighter design because the flexible carrier structure assumes, in part, the function of the frame which, consequently, can be designed to be lighter. Moreover, in operation, the first and second frame parts cannot pivot beyond the folded-out position because the flexible carrier structure bounds the distance over which the first and second frame parts can pivot apart. Separate means thereto can therefore be omitted or be of light design. This too contributes to a lighter pull cart being obtained, and further to a construction which is more compact and can be folded in and out in an easier manner.

Specific embodiments of the invention are laid down in the dependent claims.

In the following, the invention is further elucidated with reference to the Figures in the accompanying drawing.

Figure 2:
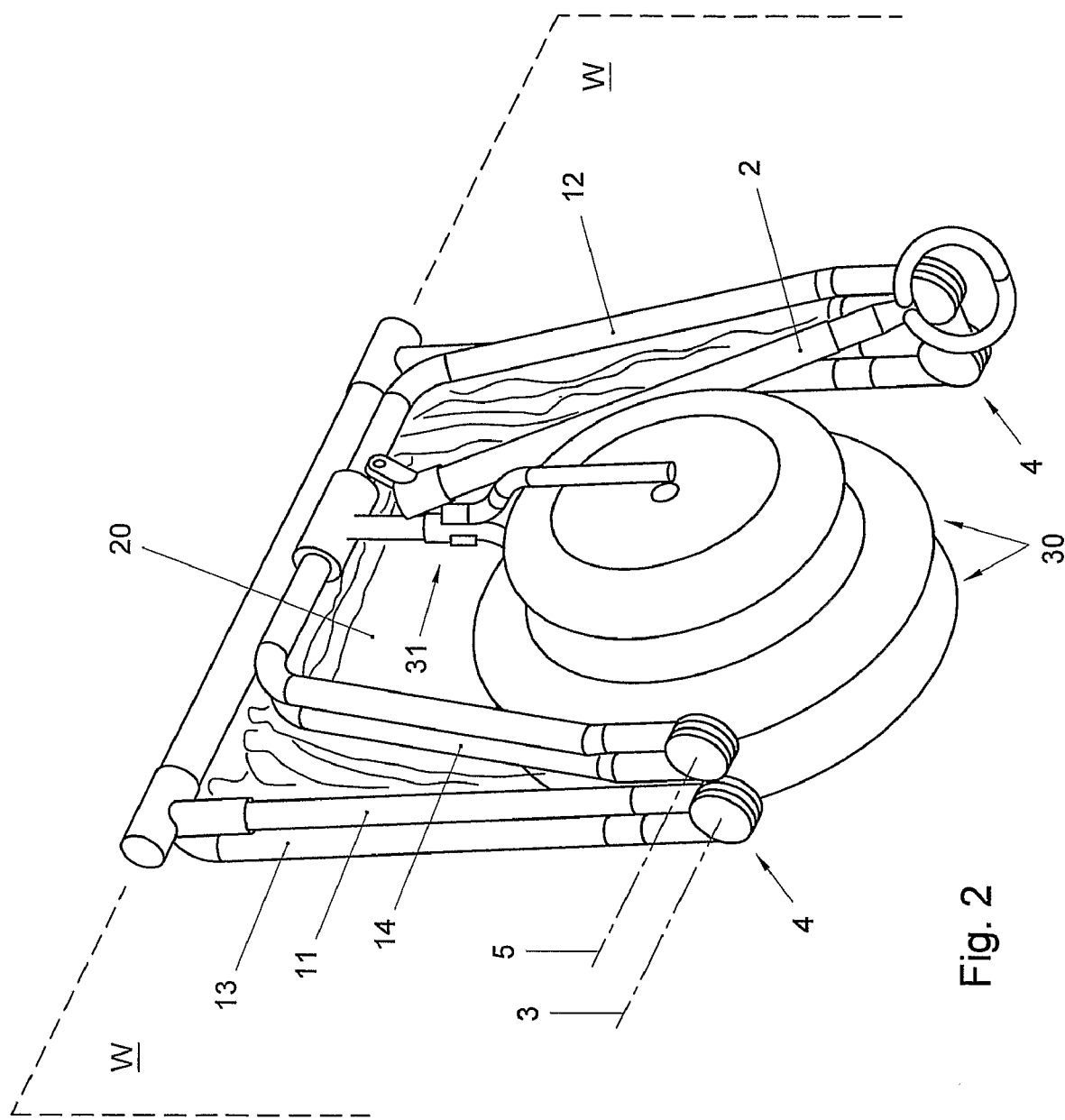
Figure 3:
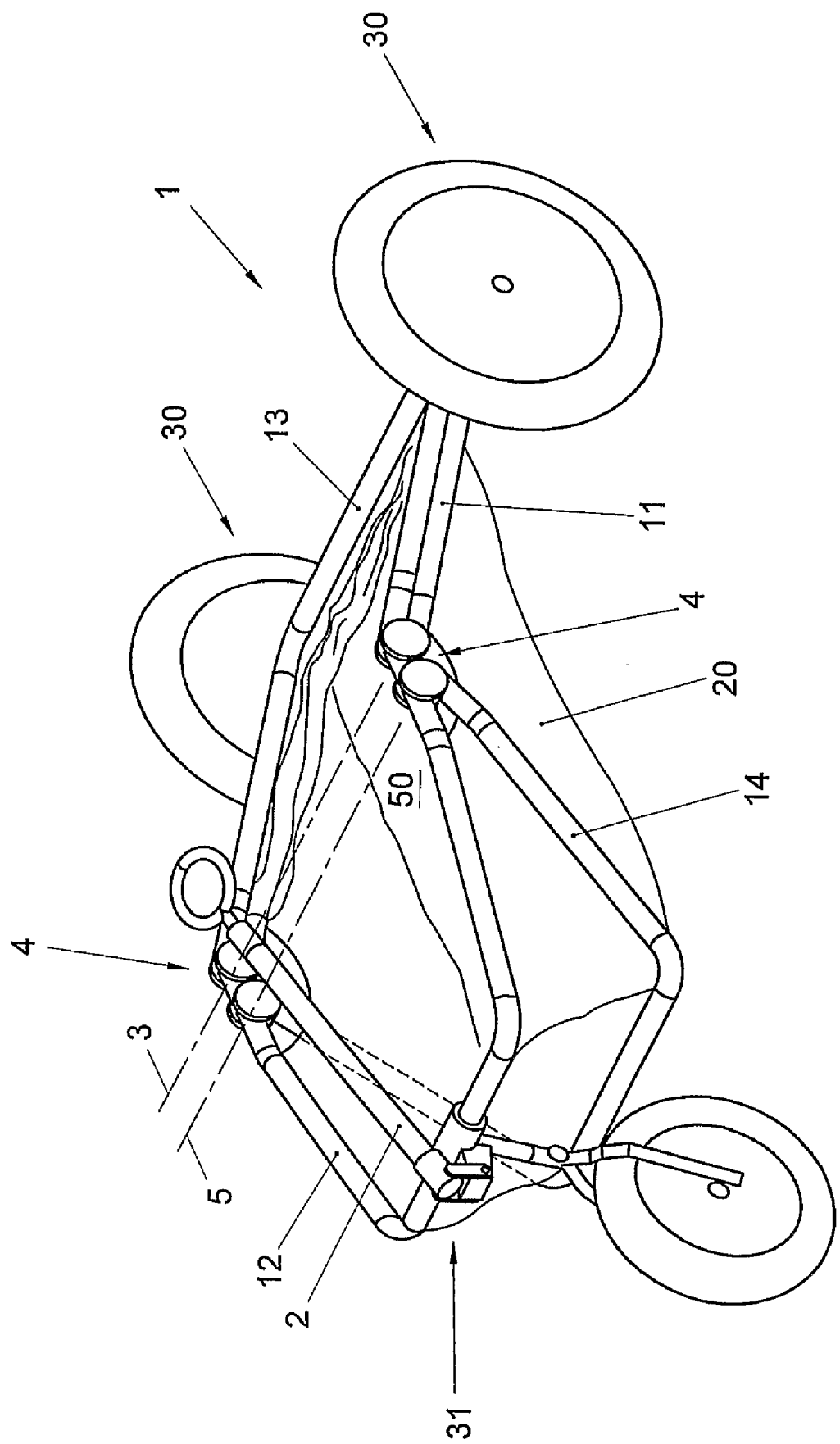
Figure 4:
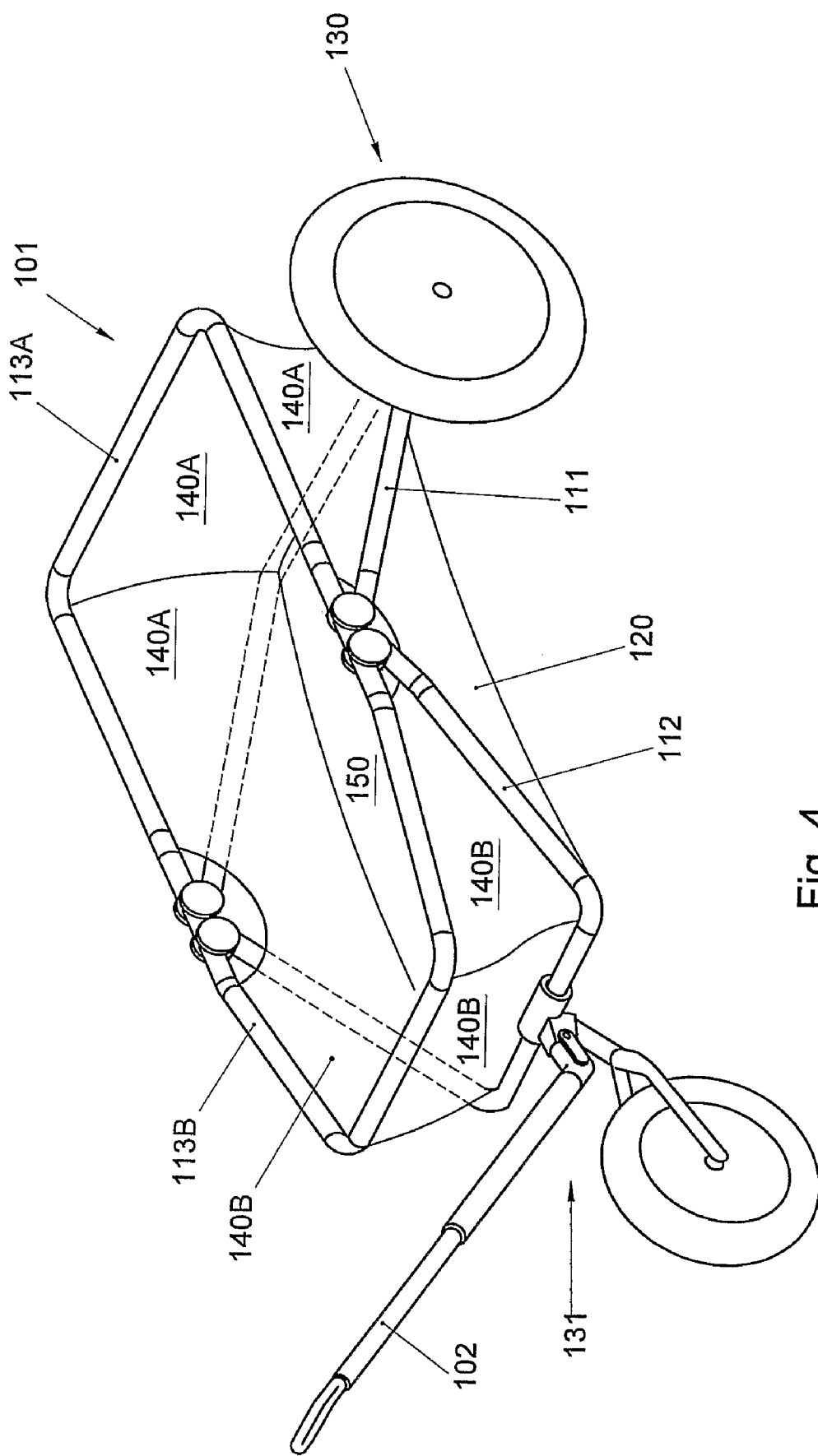

FIG. 1 schematically shows, in perspective view, an example of a first embodiment of a pull cart according to the invention in a folded-out condition;

FIG. 2 schematically shows once more the example of FIG. 1, in perspective view, with, however, the pull cart in collapsed condition;

FIG. 3 schematically shows once more the example of FIG. 1, in perspective view, with, however, the pull cart in a different folded-out, operative condition;

FIG. 4 schematically shows, in perspective view, an example of a second embodiment of a pull cart according to the invention in a folded-out condition.

Reference is first made to FIGS. 1-3. In these Figures is shown a pull cart 1 comprising a frame 11, 12, 13, 14, a flexible carrier structure 20 connected to the frame for carrying a load, and a suspension 30, 31 connected to the frame and which supports the frame in operative condition. The frame comprises a first, substantially U-shaped frame part 11 and a second substantially U-shaped frame part 12, which frame parts can be manufactured from, for instance, aluminum tubes. According to this example, the flexible carrier structure 20 is an assembly of non-stretch cloth such as canvas or cloth from nylon and/or polyester, coated or not coated. But also cloth compositions of other natural and/or artificial fibers are possible.

The suspension comprises a first suspension part 30 connected, in FIGS. 1 and 3, to the first frame part 11 and a second suspension part 31 connected to the second frame part 12. In the example shown, the first suspension part 30 comprises two detachable wheels. In the example shown, the second suspension means 31 comprises one wheel which is connected via a fork, a head tube and a handle bar to the bottom of the U-shape of the second frame part 12. In the example shown, a pull bar 2 is connected to the second suspension part 31. With the aid of this pull bar, the pull cart can be pulled and the wheel can be steered. Preferably, the pull bar hinges relative to the second suspension part 31 and is preferably detachably connected thereto by means of, for instance, a snap system. Also, the pull bar can be length-adjustable.

In this example, the connection between the second suspension part 31 and the second frame part 12 is effected by a substantially T-shaped coupling part manufactured from, for instance, a suitable plastic, while the vertical part of the T-shape is connected to the handle bar and the horizontal part of the T-shape is tubular and, with its tubular shape, encloses the bottom of the U-shape of the second frame part 12. It is preferred that this enclosure can hinge while the second suspension part 31 can be secured relative to the second frame part 12 in at least two hinged positions.

The first frame part 11 can hinge relative to the second frame part 12 about an axis 3 extending substantially parallel to the bottom of its U-shape 12 between a folded-out position shown in FIGS. 1 and 3, and a collapsed position shown in FIG. 2. Here, the distance between the bottom of the U-shape of the first frame part 11 and the bottom of the U-shape of the second frame part 12 is smaller in the collapsed position than in the folded-out position. In the example shown, the first and second frame part hinging relative to each other is effected by two hinge constructions 4, located on both sides of the pull cart, the axis 3 extending through these constructions. The hinge constructions 4 may be manufactured from a suitable plastic material. Also, the hinge constructions 4 can be secured in the collapsed position and the folded-out position.

Hence, the suspension is connected to the frame such that, with the pull cart in the folded-out, operative condition shown in FIGS. 1 and 3, forces introduced through the first and second suspension parts 30, 31 force the first and second frame parts 11 and 12 apart.

In the example shown, the cloth assembly 20 is attached at a distance from the axis 3 both to the first frame part 11 and to the second frame part 12. As a result of this, and due to the length, the limited stretch and the path of the cloth assembly 20 extending between the first and second frame parts, which path, in this example, runs via a third frame part 14, the first and second frame parts are prevented from folding out beyond the folded-out position shown in FIGS. 1 and 3.

It is noted that the cloth assembly can be attached to the frame parts in various manners, for instance in that the cloth assembly is attached to securing rings around the tube sections of the frame parts.

In the example shown, the axis 3 is located in the area of the two ends of the first frame part 11, i.e. in the area of the two free ends of the legs of the U-shape of the first frame part 11. This offers the advantage that the frame construction is compact. The axis 3 is also located in the area of the two ends of the second frame part 12, which contributes towards a compact frame construction too.

In the example shown, the frame comprises a third substantially U-shaped frame part 14, and an additional, substantially U-shaped frame part 13. By means of these frame parts, additional options for use of the pull cart can be obtained. In the example, the axis 3 is situated in the area of the two ends of each of these frame parts 13 and 14, thereby contributing towards a compact construction. In operative condition, the cloth assembly 20 is connected to each of these frame parts 13 and 14, so that, in operative condition, upstanding walls 40 and 60 of a loading space of the pull cart can be created. In this example, besides the axis 3, an additional axis 5 extends through the two hinge constructions 4. Each of the two hinge constructions 4 is designed such that the pivots 3 and 5 lie close together and are at a fixed mutual distance. The first frame part 11 can hinge relative to the first additional frame part 13 about the axis 3. The second frame part 12 can hinge relative to the third frame part 14 about the additional axis 5. However, hinge constructions with coinciding pivots 3 and 5 are also possible.

In the folded-out position when the pull cart is in the operative condition, the upstanding walls 40 can be folded as a result of the additional frame part 13 hinging relative to the first frame part 11. The corresponding, collapsed condition is shown in FIG. 3. With the pull cart in this condition, the loading space of the pull cart is easily accessible, which offers, inter alia, the advantage that a person can easily "scoot" with the pull cart. If the pull bar 2 is in a hinged position relative to the second suspension part 31, as shown in FIG. 3, such that the pull bar can easily be gripped from the loading space of the pull cart, the pull cart can also be steered while scooting.

In the folded-out position, the third frame part 14 together with the cloth assembly 20 connected thereto, forms at least a part 50 of a floor of the loading space of the pull cart. Here, in the folded-out position, the floor part 50 extends between the bottom of the U-shape of the first frame part 11 and the bottom of the U-shape of the third frame part 14, and at least a part of an upstanding wall 60 extends between the bottom of the U-shape of the third frame part 14 and the bottom of the U-shape of the second frame part 12. Since, in this manner, the loading floor hangs low relative to the location where the second suspension part 31 is connected to the second frame part 12, a stable handling of the pull cart is obtained.

It is noted that the loading space of the cart can be intended for various loads, for instance for persons, such as children, but also for various goods.

With the pull cart in the collapsed condition shown in FIG. 2, the first frame part 11 is in the collapsed position relative to the second frame part 12. In this collapsed condition, the plane in which the U-shape of the second frame part 12 substantially lies, is more or less parallel to a plane W in which the U-shape of the first frame part 11 substantially lies. In FIG. 2, the additional frame part 13 is pivoted relative to the first frame part 11 about the axis 3 such that the plane in which the U-shape of the additional frame part 13 substantially lies is also more or less parallel to the plane W. Further, the third frame part 14 in FIG. 2 is pivoted relative to the second frame part 12 about the additional axis 5 such that the plane in which the U-shape of the third frame part 14 substantially lies is also more or less parallel to the plane W. Further, in FIG. 2, the two wheels of the first suspension part 30 are detached from the first frame part 11 and placed between the legs of the U-shapes of the frame parts with their disc faces more or less parallel to the plane W. Also, in FIG. 2, the second suspension part 31 and the pull bar 2 connected thereto are placed between the legs of the U-shapes of the frame parts, with the handle bar and the disc face of the wheel of the second suspension part 31 and the pull bar 2 also placed more or less parallel to the plane W. Hence, a compact, collapsed condition of the pull cart is possible, in which condition the pull cart can be stored, for instance in a suitable carrier bag. The fact that the mutual pivotal movement of the first frame part 11, the second frame part 12, the third frame part 14 and the additional frame part 13 is effected by two hinge constructions 4 located on both sides of the pull cart, renders collapsing the pull cart easy because the different hinging movements of the different frame parts take place at two central locations. As shown in FIG. 1, the two hinge constructions 4 are each located on an edge of the frame, turned upward in the condition shown. In this manner, folding the pull cart is further simplified because the two central locations where the different hinging movements take place are well accessible to a user.

It is noted that the hinge constructions 4 can be secured in various pivotal positions of the different frame parts, for instance in the different pivotal positions shown in FIGS. 1-3.

Reference is now made to FIG. 4, in which an example of a second embodiment of a pull cart 101 according to the invention in folded-out condition is shown. This second embodiment comprises a first frame part 111, a first suspension part 130 connected thereto, a second frame part 112 with, connected thereto, a second suspension part 131 to which a pull bar 102 is connected, a cloth assembly 120 connected to the frame parts, and a first additional frame part 113A with which upstanding walls 140A are created, all this in a manner similar to that of the first embodiment according to FIGS. 1-3. A difference between the first and second embodiment is, however, that the second embodiment comprises a second additional frame part 113B, with which upstanding walls 140B are created, and that in this second embodiment, a third frame part, similar to the third frame part 14 of the first embodiment, is omitted. An advantage of this second embodiment is that on the side of the pull cart 101 facing the second suspension part 131 too, it has upstanding walls 140B which, in folded-out position, when the pull cart 101 is in operative condition, can be folded.

In the two exemplary embodiments shown of FIGS. 1-4, as described hereinabove, each time, a pull bar is connected to the second suspension part. When the pull cart is being pulled, the tensile force transmitted via this pull bar too forces the first and second frame parts apart. As a result, in these exemplary embodiments, the favorable effect that the tensile forces in the cloth assembly contribute to the strength of the pull cart in the pulled, operative condition is reinforced with respect to the non-pulled operative condition.

It is noted that after the foregoing, various modifications are possible. For instance, the second suspension part 31 or 131 can be designed with, for instance, two wheels instead of one wheel, or even be designed without a wheel. In this latter case, the second suspension part 31 or 131 can for instance be suitably designed to be attached to a pulling vehicle such as for instance a bicycle. Further, instead of wheels, the first and/or second suspension part can also comprise skis, skating blades or the like, or the wheels can be exchanged with skis, skating blades or the like. The frame may also comprise several frame parts of the described types or of a different type. The pull cart can further comprise an appropriate brake system, for instance a system in which one or more of the wheels of the first and/or second suspension part have brakes. Operating elements of such a brake system can be provided on various locations on the pull cart, for instance on a handle of the pull bar. Further, the flexible carrier structure can be provided with foam and/or hard floor parts. Such hard floor parts can for instance be pivotally connected to parts of one or more frame parts, so that, with the frame parts in different, folded-out positions, these hard floor parts can for instance also serve as spacers between different frame parts. For this latter purpose however, also other types of spacers can be used. The vehicle can further be motor-powered, for instance by means of an electric motor. This drive can for instance be an auxiliary drive with operating elements on the pull bar. These and similar modifications are understood to fall within the framework of the invention as defined in the appended claims.

The invention claimed:

1. A pull cart comprising a frame, a flexible carrier structure connected to the frame for carrying a load, and a suspension connected to the frame, which supports the frame in operative condition; wherein:

the frame comprises a first substantially U-shaped frame part and a second substantially U-shaped frame part;

the suspension comprises a first suspension part connected to the first frame part and a second suspension part connected to the second frame part;

the first frame part can hinge relative to at least the second frame part, about an axis extending substantially parallel to the bottom of its U-shape, between a collapsed position and a folded-out position, while the distance between the bottom of the U-shape of the first frame part and the bottom of the U-shape of the second frame part is smaller in the collapsed position than in the folded-out position; and in the folded-out position with the pull cart in the operative condition, on the one side, the suspension is connected to the frame such that forces introduced through the first and second suspension part force the first and second frame parts apart, and, on the other side, the flexible carrier structure connects the first and second U-shaped frame parts at least at a distance from the axis such that the first and second frame parts are prevented from pivoting apart beyond the folded-out position.

2. A pull cart according to claim 1, wherein the said axis is located in the area of the two ends of the first frame part.

3. A pull cart according to claim 1, wherein the said axis is located in the area of the two ends of the second frame part.

4. A pull cart according to claim 1, wherein the frame comprises an additional, substantially U-shaped frame part connected to the flexible structure, which frame part is pivotal relative to at least the first or second frame part, between a position in which the additional frame part together with the flexible structure connected thereto form at least one upstanding wall of a loading space of the pull cart, and a position in which said at least one upstanding wall is folded-in.

5. A pull cart according to claim 4, wherein the said axis is located in the area of the two ends of the additional frame part.

6. A pull cart according to claim 4, wherein the mutual pivotal movement of the first, the second and the additional frame part is effected by two hinge constructions located on both sides of the pull cart.

7. A pull cart according to claim 4, wherein the frame comprises a third substantially U-shaped frame part connected to the flexible structure, which frame part is pivotal relative to at least the first or the second frame part and which, together with the flexible structure connected thereto, in the folded-out position, forms at least a part of a floor of a loading space of the pull cart and at least a part of one upstanding wall of a loading space of the pull cart, which floor part extends between the bottom of the U-shape of the first frame part and the bottom of the U-shape of the third frame part, and which part of the upstanding wall extends between the bottom of the U-shape of the third frame part and the bottom of the U-shape of the second frame part.

8. A pull cart according to claim 7, wherein the said axis is located in the area of the two ends of the third frame part.

9. A pull cart according to claim 7, wherein the mutual pivotal movement of the first, the second and the third frame part is effected by two hinge constructions located on both sides of the pull cart.

10. A pull cart according to claim 9, wherein the two hinge constructions located on both sides of the pull cart each comprise two pivots lying close together at a fixed mutual distance.

11. A pull cart according to claim 9, wherein the two hinge constructions located on both sides of the pull cart are each situated on an edge of the frame turned upwards in folded-out position, when the pull cart is in operative condition.

12. A pull cart according to claim 1, wherein a pull element is connected to the second suspension part.

* * * * *